United States Patent
Ingemar et al.

[11] 3,809,447
[45] May 7, 1974

[54] HOLDER FOR AN OUTER RACE OF A ROLLER BEARING

[75] Inventors: Fernlund Ingemar, Hindas; Hallerback Stig, Frolunda, both of Sweden

[73] Assignee: SKF Industrial Trading & Development Co. BV, Jutphaas, Netherlands

[22] Filed: Nov. 10, 1972

[21] Appl. No.: 305,381

[52] U.S. Cl. .............................. 308/236, 308/184
[51] Int. Cl. ........................ F16c 33/30, F16c 27/00
[58] Field of Search ............................ 308/184, 236

[56] References Cited
UNITED STATES PATENTS
977,692   12/1910   Zahn ................................. 308/184

Primary Examiner—Charles J. Myhre
Assistant Examiner—Frank Susko
Attorney, Agent, or Firm—Daniel M. Rosen

[57] ABSTRACT

A bearing mount wherein there is provided one or more channels in the contact surface of the holder and/or outer race, with a longitudinal axis situated in a plane which is perpendicular to the bearing axis, while in the place of the channel a strip is fixed on the holder, the said strip being made of an elastic material, which may, for example, be rubber. The thickness of the strip in unstressed condition in a radial direction is larger than the total depth of the channel concerned, while so much space is left in the channel on either side of the strip in axial direction, that the axial cross-section of the strip is at most the same as the surface of an axial cross section of the channel in the particular spot.

5 Claims, 4 Drawing Figures

HOLDER FOR AN OUTER RACE OF A ROLLER BEARING

The invention concerns a holder for an outer race of a roller bearing, the inner surface of the holder and the outer surface of the outer race being circle-cylindrical contact surfaces movable relative to each other in a direction perpendicular to the center line of the bearing.

Such types of holders are generally known in practice. For example, they are applied in combination with bearings to the wheels of railroad cars. Such bearings may be composed of a roller bearing with an inner and an outer race, between which one or more rows of roller elements are provided. The holder, which is also known under the term "seat" or "saddle," rests on the outer surface of the outer ring, as a result of which the weight of the car or a part of the weight is transferred onto the wheels.

The contact surfaces of the holder and the outer race are adjusted to one another so that maximum friction is generated between both surfaces, and whereas they are dimensioned in such a way that the shocks the wheels are exposed to do not cause breaks.

A drawback of known arrangements of holders and roller bearings is that in spite of the high friction between the contact surfaces of holder and outer race the relative motions of contact surfaces of holder and outer race cannot be prevented during heavy shocks. For example, when the car-wheel passes over an uneven place, the pressure between the holder and the outer race will be reduced temporarily. Due to the reduced friction between both contact surfaces it might occur that in a given moment the friction is not sufficient to fix the contact surface with regard to one another. In this case, the rotation of the outer race under the holder may cause a relative shift. Such rotation involves the drawback that the metal contact surface of the holder will be worn out, on account of which the holders (saddles) have to be exchanged periodically.

The object of the present invention is to eliminate this drawback.

The foregoing object of the invention can be achieved by providing one or more channels in the contact surface of the holder and/or outer race, with a longitudinal axis situated in a plane which is perpendicular to the bearing axis, while in the place of the channel a strip is fixed on the holder, the said strip being made of an elastic material, which may for example be rubber. The thickness of the strip in an unstressed condition in a radial direction is larger than the total depth of the channel concerned, while so much space is left in the channel on either side of the strip in axial direction, that the axial cross-section of the strip is at most the same as the surface of an axial cross section of the channel in the particular spot.

As a rule the channel with the rubber strip fastened therein is arranged in the contact surface of the holder. It is also possible to arrange the channel in the outer race of the bearing alone, provided that the strip of an elastic material is fastened to the holder; while it is also possible to provide channels in the holder and the outer race, arranged in the same plane or in parallel planes which are perpendicular to the center line of the bearing, provided that the strip of each channel or arrangement of channels facing each other, is fixed to the holder.

Due to such arrangement the compression of the elastic material of the strip generates extra friction between the contact surface of the holder and the outer surface of the outer race. Such extra friction provides a better fixation of the outer race in the holder. Moreover, the stress presented in the strip (caused by the compression) ensures that during shocks, i.e., in cases where there is hardly any contact or no contact at all between the metal parts of the contact surfaces between holder and outer race, some degree of friction will be generated between the holder and the outer race at the place of the strip, on account of which the rotation of the outer race can be prevented or at least reduced.

It should be noted, that in a copending U.S. application Ser. No. 302,174, filed Oct. 30, 1972, assigned to the assignee of the present invention a recommendation has been made to solve the same problem by means of a ring of an elastic material, that is mounted on the outer race of the bearing, the radial thickness of the said ring increasing towards the periphery. Such solution displays the advantage that should there occur a rotation of the outer race with regard to the holder, a thicker part of the ring of elastic material will be clamped, thereby intensifying the blocking effect. However, as a rule there is no space for such rings of elastic material.

The elastic strip according to the invention displays in unstressed state a thickness in radial direction which is larger than the depth of the corresponding channel.

In unloaded state, when the holder does not repose on the outer race of the roller bearing, the strip extends radially from the contact surface. In loaded state, when the holder presses on the contact surface, the strip will be compressed so that the contact surface becomes circle-cylindrical again. The thickness of the strip in the radial direction has to be sufficiently large to display, upon compression, the extra-friction that is necessary for the satisfactory functioning in accordance with the invention. The surface of an axial section through the strip should at most equal the surface of an axial section through the channel at the place measured between the contact surfaces so that the strip material has sufficient space during compression for evasion within the channel.

Upon the surface of the strip being too large or that of the channel too small, the material cannot be displaced during loading and compression of the strip, causing thereby an unwanted loading on the outer race. The force which is transferred through the holder onto the outer race of the bearing should preferably attack at the middle above a series of roller elements of the bearing, or in case there are several series, symmetrically with regard thereto.

Theoretically it is not necessary that the channel in the contact surface of the holder passes over the entire surface area. In practice, however, it is preferable that the channel passes over the entire surface, because in this way the strip can be fastened better and the production process can be simplified.

It is important to provide a reliable fixation of the strip in the holder's channel. There are several possibilities for this purpose. For example, a rubber strip can be fixed in the channel by vulcanization. Another good fixation can be ensured by providing in the bottom of the channel a second smaller channel, the longitudinal axis of which coincides with the longitudinal axis of the first channel, the width thereof equalling the axial width of the strip, and to the bottom of which the strip is fixed. The strip can also be fastened to the holder in a stable manner by making the strip longer than the channel.

The strip parts, extending over both ends of the channel, grip around a part of the holder bordering on the contact surface. The bent ends of the strip can be fixed by vulcanization, for example. In addition, the extending strip parts can be provided with metal strips, which are fixed in or on the strip material. Such metal strips ensure a more stable fixation of the elastic strip. It is also possible to apply a long metal strip to the elastic strip, instead of two metal strips, that runs over the entire length of the elastic strip, i.e., over the entire bottom of the channel in the holder and along the border zones. The fixation of strip ends around the borders of the holders can be effected by conventional means.

The invention will be explained with reference to drawings, wherein.

Figure 1:
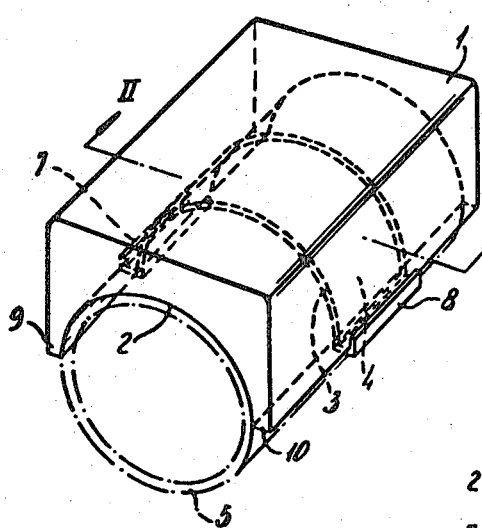
FIG. 1 represents a perspective of a holder, with a strip according to the invention, for a circle-cylindrical ball bearing.

FIG. 1 represents a holder 1. This holder 1 displays a circle-cylindrical inner surface 2, wherein the channel 3 is provided. In the channel 3 an elastic strip 4 is fixed to the holder. The holder 1, comprising the strip 4 is mounted on a ball bearing 5. The holder 1 is positioned on the circle-cylindrical outer surface of the outer race of the ball bearing 5. The ball bearing 5 is represented in FIG. 1 only in a schematic manner.

Figure 2:
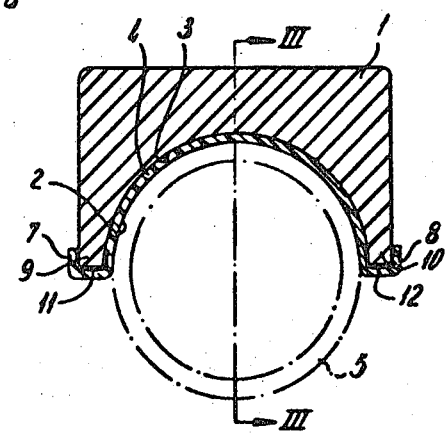
FIG. 2 represents a cross-section through a holder and a strip according to the invention, through the line II—II of FIG. 1, perpendicularly to the bearing axis.
Figure 3:
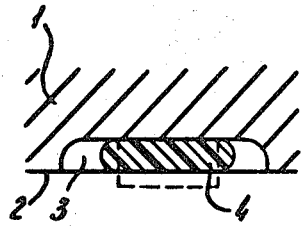
FIG. 3 represents a part of the cross-section at the spot of the strip, perpendicularly to the direction of a channel, through the line III—III of FIG. 2.
Figure 4:
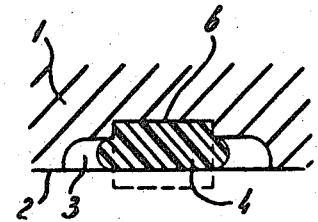
FIG. 4 represents a part of such a cross-section for another type of the channel structure.

When under load, the holder 1 presses on the outer race, thereby compressing the strip 4 between the bottom of the channel 3 in the holder and the outer surface of the outer race; the dotted line indicates the outline of the strip 4 in unloaded state. In FIG. 4 the channel 3 in the holder 1 displays a second channel 6, wherein the strip is arranged, in order to ensure a better fixation. A preferred embodiment of the strip 4 is represented in cross-section in FIG. 2. The strip 4 has such a length, that the ends (7,8) thereof grip around the border parts (9,10) of the holder 1. In order to ensure a still stronger fixation of the strip 4 in the holder, the ends (7,8) of the strip are provided with metal strips (11,12) in or on the elastic material of the strip. In FIGS. 3 and 4, it is visible that upon a relative shift of the metal contact surfaces of the holder and outer race, for example, under shock effects, the elastic strip 4 is compressed to a lesser extent, while displaying the tendency to return into the state indicate by the dotted line. In this way the contact between the strip 4 and the outer race can be maintained, when the arrangement is exposed to shocks. The friction thereby arising ensures an essential reduction or, as the case may be, a complete elimination of the rotation of the outer race.

What is claimed is:

1. In combination with a roller bearing having an outer race, a holder comprising an inner surface fittable about said outer race along a circle-cylindrical contact surface, said outer race movable with respect to said holder in a direction perpendicular to the center line of said bearing, means forming a channel along said contact surface along a line corresponding to said direction, a strip of elastic material fixed on said holder and contained within said channel, wherein the thickness of said strip in an unstressed condition is larger in its radial direction than the total depth of said channel and the breadth of said strip in stressed condition in its cross section is not greater than the axial cross section of said channel at the location of said stressed condition, said roller bearing outer race fitted into said holder and stressing said elastic strip for resisting movement of said outer race in said holder in said direction.

2. A holder according to claim 1, wherein in the bottom of the said channel there is a second, narrower channel whose longitudinal axis coincides with the longitudinal axis of the said first channel, whose width is equal to the axial thickness of the strip in unstressed condition and on whose bottom the strip is fixed.

3. A holder according to claim 1 wherein said channel continues along the entire contact surface of the holder.

4. A holder according to claim 3, wherein the strip is longer than the channel, and that the parts of the strip projecting at either end of the channel grip around a part of the holder bordering on the contact surface.

5. A holder according to claim 4, wherein the projecting parts of the strip are provided with a metal strip placed in or on such parts.

* * * * *